Patented Mar. 14, 1944

2,344,104

UNITED STATES PATENT OFFICE 2,344,104

MANUFACTURE OF SODIUM SULPHIDE

George A. Peirce, Westfield, N. J., assignor to E. I. du Pont de Nemours & Company, Wilmington, Del., a corporation of Delaware No Drawing. Application August 3, 1940,
Serial No. 351,251

2 Claims. (Cl. 23—134)

This invention relates to the manufacture of sodium sulphide and has to do more particularly with the reduction of sodium sulphate with coal in a rotary furnace.

The manufacture of sodium sulphide through the reduction of sodium sulphate is complicated by the fact that the reaction is endothermic, by the relatively low melting point of the sodium sulphate, by the formation of impurities including sodium carbonate, sodium polysulphides, sodium thiosulphate, etc., and moreover by the ease with which the sodium sulphide, especially in the dry and heated state, is reoxidized to sodium sulphate.

In carrying out the reactions in a rotary furnace the charge, which is made up of sodium sulphate and coal, passes through three stages or periods. The first is commonly known in the art as the heating or melting period, the second the boiling period, and the third the drying period. The latter period is also commonly referred to as the roll, since as the melt begins to dry it begins to roll in the rotary furnace. In the past it has been customary to observe closely these various cycles and to discharge the rotary when the charge begins to roll. The point of discharge has heretofore been considered highly critical, for if the charge were allowed to remain in the rotary after it began to dry up and to roll it would begin to liquefy with attendant reduction in conversion and difficulties of handling.

One characteristic of the prior art operation was that when the charge solidified it set up into a hard cake, probably due to oxidation of some of the sulphide to sulphate. The formation of these cakes required special leaching practices and also special processing of the liquors so obtained. Thus in the customary leaching practice there was produced a strong liquor saturated with carbonates and sulphates and a weak liquor containing the bulk of the carbonates and sulphates. (The solubility of the sulphates and carbonates in the strong liquor is relatively low so that the bulk of the carbonate and sulphate was to be found in the weak liquor.) In concentrating the strong liquor on a bench or other concentrating apparatus the carbonates and sulphates settled out so that it was necessary periodically to clean out the concentrating pans and to return the residue to the rotary for reconversion. This was considered more expedient and economical than precipitating the carbonates and sulphates with barium sulphide. In the weak liquors, however, the carbonates and sulphates were so precipitated and the filtrate concentrated to crystallizing strength.

This invention is directed to improvements in rotary furnace operations of the character described above and has for its objects the elimination of the various undesirable characteristics of the prior art process. Thus an object of the invention is to obtain high conversion efficiency. Another object of the invention is to obtain an ash which is easily handled and leached. Another object of the invention is to eliminate by-product reactions in order to obtain a high purity ash. Another object of the invention is to provide simplified methods of working up the leach liquors. Another object of the invention is to provide methods in which residue and impurities may be separated from leach liquors on high-speed filtering devices. Other objects will appear hereinafter.

These objects are accomplished by the present invention of which the following is a typical operation.

Before the rotary is charged the burner settings are adjusted to the desired heating capacity and to a distinctly reducing atmosphere. When properly adjusted the stack gases will contain from about 1–5% CO and around 12% $CO_2$. The rotary is then charged with 6000 pounds of salt-cake, which contains around 95% $Na_2SO_4$, together with 2200 pounds of coal. The rotary is sealed up and the charge is allowed to react over a period of about 2 hours. A fifty pound bag of sulphur is added during the boil. About one-half to three quarters of an hour may be taken up during the heating and melting period, from about three quarters to one hour will be taken up during the boiling period, and about 20 to 30 minutes will be taken up during the roll.

It is in this last particular that the invention distinctly differs from the prior art processes, for whereas the prior art found it necessary to discharge immediately that the charge began to dry up and roll, I am able under the conditions of my invention in which the burner is adjusted to a reducing atmosphere to continue the roll for an extended period and by so doing obtain substantial advantages in increased conversion and reduction om impurities.

Among the by-product impurities formed in the process are sodium thiosulfate, sodium carbonate, sodium polysulphide, sodium hydroxide, and sodium hydrosulphide. My experiments have shown that by-product impurities are formed rapidly in the first stages of the reaction more or less in inverse proportion to the temperature. On continued heating the impurities interact or some reaction takes place which accomplishes a reduction in these impurities. I have observed that if the heating is continued over too long a period the amount of impurities again increases and that this same cycle of formation, decrease and increase of impurities, obtains irrespective of the temperature, the principal effect of higher temperature being an accelerated rate of reaction. Thus the point in the reaction at which the impurities are at a minimum will occur sooner at higher temperature than at a low temperature.

In applying these principles to the operation of the rotary converter as described above I have found that the point of minimum content of impurities occurs during the dry roll some 10 minutes or more after the charge begins to roll. Thus, by allowing the charge to roll in the rotary in a reducing atmosphere for a substantial period I am able to obtain a product having a lower content of impurities than in the prior art process and consequently to obtain higher conversion efficiency. Conversion efficiency is expressed as the ratio of sulphur as sodium sulphide to the total sulphur in the product.

Still another important feature of my invention lies in the selection of the particular point in the time cycle for dumping the charge. From the considerations already given it is apparent that the optimum conversion rate is obtained when the impurities are at a minimum, and that if heating is continued beyond this point a reduction in conversion efficiency necessarily follows. Thus, taking into account that the heating cycle or rates of reaction for two successive charges are seldom identical, the problem is to determine whether the charge shall be dumped after a 10 minute roll, a 20 minute roll, a 30 minute roll, or some intermediate or extended time.

I have found that the proper time for dumping the charge can readily be determined by observing the carbon dioxide content of the flue gases. In the course of the reaction and particularly during the boil there is a strong evolution of carbon dioxide as a result of the reduction of sodium sulphate. As the charge begins to dry up and roll there is a dropping off of the carbon dioxide evolution which continues on throughout the period of the roll. As long as the carbon dioxide content of the flue gases continues to drop I have found it desirable to continue the roll, since it appears that it is during this period that the carbonates interact with the polysulphides to form sodium sulphide and liberate $CO_2$. I have found that most satisfactory results are obtained if the charge is dumped substantially coincidentally with the levelling off of the $CO_2$ curve. If it be recalled that the burner settings have been adjusted to produce approximately 12% $CO_2$ then it will be apparent that this is the figure which the $CO_2$ line will approach. Thus I prefer to dump the charge when the $CO_2$ content of the flue gas drops off to around about 12-14 per cent.

Having determined the proper time the charge is dumped and with as little exposure to the atmosphere as possible is transferred to a rotary cooler where sealed from the atmosphere it is permitted to cool over a period of half an hour or more until it is at a suitable temperature (say below 400° F. and preferably around 200° F.) at which it may be discharged into a leach tank. By cooling the charge in substantial absence of air the charge does not set up into a solid cake as in the prior art processes. Two factors appear responsible for this; first, the extended roll period in the rotary furnace operation prevents excessive carbonate and sulphate concentrations in the charge and second, the cooling in substantial absence of air prevents reoxidation of the sulphide to sulphate. In this manner the principal caking factors are reduced and held at a non-deleterious figure. The ash is discharged directly from the rotary cooler into suitable leaching vats to avoid oxidation. The dry ash if left exposed to the air oxidizes more rapidly than aqueous solutions. Hot water is used for leaching and agitation may be provided to produce a slurry which may be pumped from one vat to another if desired.

An important aspect of the invention to be noted at this point is the nature of the ash discharged from the rotary cooler. This ash is red and friable. It is a mixture of granular and powdery material. It is slightly sandy and is so easily free-flowing that any conventional pick-up and discharge mechanism may be utilized in discharging it from the cooler. This makes possible improved and simplified leaching methods. Thus, a large percentage of the ash is sufficiently fine easily to be slurred, and the remaining relatively few larger particles may be easily disintegrated by effecting the leaching in a ball mill or by separating them by elutriation, crushing them in a hammer mill and returning the crushed product to the leached slurry.

The low sulphate and carbonate content of the ash makes it possible to treat all of the leached slurry with barium sulphide with economy. The barium sulphide is conveniently added to the leach tank during leaching of the slurry and when the leaching is complete all of the solid residue of the ash and the precipitated sulphate and carbonate will be in such form that it may be readily filtered in a standard drum filter. Thus, a highly pure liquor by a single simple leach and high-speed filtration is obtained. The liquor is sufficiently free of sulphate and carbonate that no problem is encountered in crystallizing these salts in evaporating the liquor to flaking strength. Thus the bench may be operated without shut downs for removal of incrustations of carbonate and sulphate or more modern and efficient concentrators may be employed.

In the operation of the rotary furnace as described it is desirable to add about 50 pounds of sulphur during the boiling period. The purpose of this addition is to compensate for sulphur lost in a process usually as sulphur dioxide. The effect of the addition is to effect a further reduction in the amount of sodium carbonate in the ash. Sulphur, polysulphides, and bisulphates (nitrecake) are commonly used for this purpose.

In the following table there are given typical analyses of the ash as discharged from the rotary furnace. These analyses are taken from samples cooled in an airtight container.

| Ingredients | Run I | Run II | Typical run |
| --- | --- | --- | --- |
| $Na_2S$ | 78.98 | 71.52 | 70-80 |
| $Na_2CO_3$ | 2.32 | 5.36 | 2-5 |
| $Na_2SO_4$ | 0.05 | 0.05 | 0.05-0.2 |
| Polysulphide | 0.28 | 0.29 | 0.1-0.3 |
| $Na_2S_2O_3$ | 0.31 | 0.44 | 0.2-0.5 |
| NaOH | 0.32 | | 0.5-0 |
| NaHS | | 1.84 | 0-2 |
| Coke and insoluble matter | Balance | Balance | Balance |
| Conversion efficiency | 96.66 | 93.32 | |

Run I is typical of what is considered a good run. The combined sulphate and carbonate is less than 3% and the amount of other impurities is relatively small. The run is not the best obtainable and conversion efficiencies as high as 98% are not uncommon. If the operation is closely controlled it is possible to obtain an average of 95-96% conversion.

In the operation described the oil burner settings are left unchanged throughout and high heating efficiency is obtained by maintaining the atmosphere low in CO, that is, between about 1 and 5% CO. It is not essential to the processes of this invention, however, that the burner be set throughout the operation since it may be regulated as desired according to the particular requirements of the process at any given time. Thus, in the earlier stages of the reaction it is not particularly important that a reducing atmosphere be maintained and the burner settings may be adjusted accordingly. The main consideration is to see that the atmosphere is sufficiently reducing throughout the roll period since otherwise the charge may go liquid during the extended roll characteristic of the invention. Thus, it is possible during the melting and boiling period to operate with more efficient combustion and to reduce the amount of air prior to the roll in order to give the desired reducing atmosphere. These and other modifications as will be apparent to those skilled in the art may be made without departing from the spirit and scope of the invention.

I claim:

1. In the manufacture of sodium sulphide by the reduction of sodium sulphate with a solid carbonaceous reducing agent the step of placing a charge of said sodium sulphate and solid carbonaceous reducing agent in a rotary furnace, continuously passing combustion gases through the interior of said rotary furnace to heat the charge therein and continuously withdrawing said combustion gases mingled with the gaseous products of the reaction, said combustion gases containing a predetermined percentage of carbon dioxide and sufficient carbon monoxide to make said combustion gases reducing and having sufficient heat content to cause the said charge to go through a melting period, a boiling period and finally to dry up, rolling the dried up charge for a substantial period while continuing the passage of said combustion gases, terminating when said charge ceases to evolve any substantial amount of $CO_2$ and cooling the charge out of contact with air.

2. In the manufacture of sodium sulphide by the reduction of sodium sulphate with a solid carbonaceous reducing agent the step of placing a charge of said sodium sulphate and solid carbonaceous reducing agent in a rotary furnace, continuously passing combustion gases through the interior of said rotary furnace to heat the charge therein and continuously withdrawing said combustion gases mingled with the gaseous products of the reaction, said combustion gases containing substantially 12% carbon dioxide and substantially 1-5% carbon monoxide and having sufficient heat content to cause the said charge to go through a melting period, a boiling period and finally to dry up, rolling the dried up charge for a substantial period while continuing the passage of said combustion gases, terminating when the carbon dioxide content of the gases leaving the rotary furnace drops to substantially 12-14%, and cooling the charge out of contact with air.

GEORGE A. PEIRCE.